US006854074B2

(12) United States Patent
McLellan et al.

(10) Patent No.: US 6,854,074 B2
(45) Date of Patent: Feb. 8, 2005

(54) METHOD OF REMOTELY MONITORING AN INTERNET WEB SITE

(75) Inventors: Mark F. McLellan, Newark, DE (US); Michael P. Dever, Thornton, PA (US)

(73) Assignee: Internetseer.com Corp., Thornton, PA (US)

( * ) Notice: Subject to any disclaimer, the term of this patent is extended or adjusted under 35 U.S.C. 154(b) by 716 days.

(21) Appl. No.: 09/727,659

(22) Filed: Dec. 1, 2000

(65) Prior Publication Data

US 2002/0069378 A1 Jun. 6, 2002

(51) Int. Cl.$^7$ ................................................ G06F 11/00
(52) U.S. Cl. ............................ 714/39; 714/48; 714/57; 714/4; 709/224
(58) Field of Search ............................. 714/48, 57, 4, 714/27, 39; 709/224

(56) References Cited

U.S. PATENT DOCUMENTS

| | | | | |
|---|---|---|---|---|
| 5,870,559 A | * | 2/1999 | Leshem et al. | ............. 709/224 |
| 6,138,157 A | | 10/2000 | Welter et al. | ................ 709/224 |
| 6,314,463 B1 | * | 11/2001 | Abbott et al. | ................ 709/224 |
| 6,317,788 B1 | * | 11/2001 | Richardson | .................. 709/224 |
| 6,549,944 B1 | * | 4/2003 | Weinberg et al. | ............ 709/224 |
| 6,636,983 B1 | * | 10/2003 | Levi | .............................. 714/4 |
| 2003/0120775 A1 | * | 6/2003 | York | ........................... 709/224 |

OTHER PUBLICATIONS

Welter, Pete J. Web Server Monitoring. web.archive.org/web/20000530135618/www.freshwater.com/white_paper/WhitePatper.html.1998.*
Geller, D. Is Something Fishy Happening To Your Website? www.technologyevaluation.com/Research/ResearchHighlights/eCommerce/2000/08/research_notes/prn_PN_EC_DPG_08_2800_1.asp. Aug. 28, 2000.*
www.svca.mercuryinteractive.com, Jul. 31, 2001–Aug. 16, 2001.
www.atwatch.com, Aug. 2, 2001–Aug. 21, 2001.
www.visualnetworks.com, Jul. 31, 2001–Aug. 22, 2001.
www.dotcom–monitor.com, Aug. 4, 2001–Aug. 15, 2001.
www.alertsite.com, Jul. 31, 2001–Aug. 16, 2001.
www.ebsure.com, Jul. 31, 2001–Aug. 22, 2001.
www.bmc.com, Jul. 31, 2001–Aug. 22, 2001.
www.netmechanic.com, Jul. 31, 2001–Aug. 6, 2001.
www.netwhistle.com, Jul. 31, 2001–Aug. 22, 2001.
www.siteprobe.com, Aug. 4, 2001–Aug. 22, 2001.
www.webassure.com, Jul. 31, 2001–Aug, 4, 2001.
www.serverrat.com, Jul. 30, 2001–Aug. 4, 2001.
www.holstix.net, Jul. 31, 2001–Aug. 23, 2001.
www.keynote.com, Jul. 31, 2001–Aug. 24, 2001.
www.freshwater.com, Jul. 31, 2001–Aug. 23, 2001.
www.envive.com, Jul. 30, 2001–Aug. 31, 2001.

* cited by examiner

Primary Examiner—Robert Beausoliel
Assistant Examiner—Yolanda Wilson
(74) Attorney, Agent, or Firm—Morgan, Lewis & Bockius, LLP

(57) ABSTRACT

A method of performing a service which remotely monitors a Web site includes the steps of monitoring the site for an error and notifying a site representative in the event an error is detected on the site. Advance permission is not obtained prior to sending the notification and a fee is not charged for the service. The appropriate e-mail address to which the notification is sent is identified based on one or more categories and a priority assigned to all e-mail addresses identified on the monitored site. The notification may be sent, alternatively, to the representative of a site linked to the site monitored or to some other interested third party. Subscribers to the monitoring service may be enrolled automatically upon submission of their site to a search engine service or to a domain name registry. The list of service recipients generated by the monitoring service is usable for other commercial purposes.

5 Claims, 25 Drawing Sheets

Email ID: ProActive Monitoring 1
Audience: Emails spidered from the Internet

Subject:
Error in Reaching http://www.someurl.com

Body:                                                                    ─ 301
There appears to be a problem in reaching your web site at www.someurl.com As recommended by the Robot Guidelines, this email is to explain our robot's activities and to let you know about the trouble in reaching your site. InternetSeer does not store or publish the content of your pages, but rather uses the link information to update our map of the World Wide Web.

If you would like to learn more about InternetSeer.com or to continue to receive these performance reports at NO CHARGE, click here:
http://www.internetseer.com/                                          ─ 303
signup.asp?pmc=12345&email=joe@someemail.com If you prefer not to receive these occasional error notices please let us know by returning this email with the word "remove" in the subject line.

Vijay Singh                                                            ─ 302
vijay@internetseer.com
Customer Service
http://www.InternetSeer.com/aboutus.asp
Web Site Monitoring
-------------------------------
Remove:Joe@someemail.com##

FIG. 3

Email ID: ProActive Monitoring 4
Audience: Emails spidered from the Internet

Subject:
Your Web Site is Back On-Line

Body:
We are pleased to inform you that http://www.someurl.com is back up and is no longer on error.

If you feel these notifications have been valuable and would like to continue to receive these performance reports at NO CHARGE, click here:
http://www.internetseer.com/
signup.asp?pmc=12345&email=joe@someemail.com Vijay Singh
vijay@internetseer.com
Customer Service
http://www.InternetSeer.com/aboutus.asp
Web Site Monitoring
-----------------------------
Remove:Joe@someemail.com##

FIG. 4

Alert Notifications should follow the following process and format
For the first alert:

Sender: Alert@InternetSeer.com

Subject Line: InternetSeer Alert

First On Error Alert:

The following URL is on Error

URL: http://www.abc.com
IP Address: 198.43.56.83
Time: 11:30:30 AM, Wednesday, September 18, 2000 (Greenwich Mean Time)
Error Code: PUT ERROR INFORMATION HERE Please visit www.internetseer.com/myinternetseer/index.jsp for additional information on the error we have found in reaching your Web site and to get up-to-the-hour performance reports.

Should you reach your Web page click the Refresh button as the Web page may be cashed on your system.

If you are still able to reach the Web page on error, please note, that we are testing from
Philadelphia, Pennsylvania, in the United States and have found an error in the path to your Web site. Your request to the Web site may take a different path that might bypass the error we detect. We will continue to monitor your web page until the error is resolved.

False Alarm Protection: After detecting the first error we will follow a quality assurance process to confirm our results. After confirming the Web site is on error we send the first Alert email.

FIG. 5

Timeout

First On Error Alert:

The following URL is on Error:

URL: http://www.abc.com
IP Address: 198.43.56.83
Time: 11:30:30 AM, Wednesday, September 18, 2000
Error Code: Socket Timeout Please visit www.internetseer.com/myinternetseer/index.jsp for additional information on the error we have found in reaching your Web site and to get up-to-the-hour performance reports.

Should you reach your Web page click the Refresh button as the Web page may be cashed on your system.

If you are still able to reach the Web page on error, please note, that we are testing from
Philadelphia, Pennsylvania, in the United States and have found an error in the path to your Web site. Your request to the Web site may take a different path that might bypass the error we detect. We will continue to monitor your web page until the error is resolved.

False Alarm Protection: After detecting the first error we will follow a quality assurance process to confirm our results. After confirming the Web site is on error we send the first Alert email.

FIG. 6

FINAL Alert (This should be sent 30 minutes from first detecting the error.)

Sender: Alert@InternetSeer.com

Subject Line: InternetSeer FINAL Alert

Final ALERT:

The following URL continues to be on Error

URL: http://www.abc.com
IP Address: 198.43.56.83
Time: 12:00:30 PM, Wednesday, September 18, 2000 (Greenwich Mean Time)
Error Code: PUT ERROR INFORMATION HERE
The error was first detected at 11:30:30 AM EDT, Monday, September 18, 2000

Please visit www.internetseer.com/myinternetseer/index.jsp for additional information on the error we have found in reaching your Web site and to get up-to-the-hour performance reports.

WE WILL CONTINUE TO MONITOR YOUR SITE UNTIL THE ERROR IS RESOLVED.

FIG. 7

RECOVERY NOTIFICATION

Sender: Alert@InternetSeer.com

Subject Line: InternetSeer Recovery

RECOVERY NOTIFICATION: The following URL is Off Error

ERROR IS NO LONGER DETECTED

URL: http://www.abc.com
IP Address: 198.43.56.83
Time: 4:00:30 PM, Wednesday, September 18, 2000 (Greenwich Mean Time)
Total Time on error: 4:30:00.

Click hear to login and view your current Web site's performance report at
http://internetseer.com/myinternetseer/reports.jsp

FIG. 8

Recovery

Recovery Notification: The following URL is Off Error:

URL: http://www.abc.com
IP Address: 198.43.56.83
Time: 11:30:30 AM, Wednesday, September 18, 2000
Time on Error: 00:25:55

Click here and login and view your current Web site's performance report at
http://www.internetseer.com/myinternetseer/reports.jsp

FIG. 9

| Gene McWilliams: Subscriber since: September 19, 2000 | InternetSeer Website Monitoring Service | | | | | | | |
|---|---|---|---|---|---|---|---|---|
| InternetSeer Features<br><br>Standard Service<br>· Remotely monitors your<br>  Web site every hour, every day.<br><br>You get:<br>· Up to 5 Free URLs monitored<br>· Unlimited contacts<br>· Email alerts<br>· Weekly performance reports | Weekly Performance Report from InternetSeer<br>For October 30-November 5<br>Dear Gene,<br><br>Thank you for subscribing to InternetSeer's 24-7 remote Web site monitoring service. As we confirmed to you in a prior email, your registration became effective on September 19, 2000.<br><br>In addition to sending alert emails to you when your site goes down, we provide this weekly report detailing the performance of your Web site(s). We welcome your input in helping us provide you with the most useful information to help you manage your business online. Please send your ideas and suggestions to CustomerService@internetseer.com. | | | | | | | |
| 69% of Web sites are down each month | To make changes to your account, add additional URLs, contacts and email addresses, you can login at www.internetseer.com. To have us email your Password to you, visit www.internetseer.com/support/forgotpassword.jsp and enter your login name, mcwilliams and password. | | | | | | | |
| How much downtime has your Web site experienced in the past 30 days?<br><br>31% - none<br>27% - less than 30 minutes<br>15% - 30 to 60 minutes<br>11% - 1 to 5 hours<br>14% - more than 5 hours<br><br>Short Cuts<br>Get top billing on search engines<br><br>Writing Internet Marketing Plans | Information for: http://www.genemcwilliams.com | | | | | | | |
| | Performance Metrics | Sa | Su | M | T | W | Th | F | Week |
| | Dates | 10/28 | 10/29 | 10/30 | 10/31 | 11/1 | 11/2 | 11/3 | |
| | Number of Outages | 0 | 0 | 0 | 0 | 0 | 0 | 0 | 0 |
| | Time on Error (HH:MM) | 00:00 | 00:00 | 00:00 | 00:00 | 00:00 | 00:00 | 00:00 | 00:00 |
| | Percent Time Up | 100.0 | 100.0 | 100.0 | 100.0 | 100.0 | 100.0 | 100.0 | 100.0 |
| | Avg Connect Times (secs) | 0.08 | 0.08 | 0.1 | 0.11 | 0.1 | 0.09 | 0.33 | 0.13 |
| | Avg Download Times (secs) | 0.05 | 0.04 | 0.1 | 0.07 | 0.05 | 0.05 | 0.05 | 0.06 |
| | If you did not request this service, or no longer wish InternetSeer to monitor your Web site and send Error Alert emails when your site goes down, reply to this email with Cancel in the subject line. ##cancel:60864## | | | | | | | |

FIG. 10

InternetSeer
Website Monitoring Service

Subscriber Since: Apr 19, 2004

Welcome James. You are currently logged in.

MY INTERNETSEER
- Control Panel
- My Profile
- Monitored Items
- Add Monitored Items
- Contacts
- Add Contacts
- Reports
- Cancel Account

SERVICES
- Standard Monitoring
- Advanced Monitoring
- Resource Center

HELP
- Support FAQ
- Glossary
- Error Codes
- Privacy Policy
- Services Agreement
- Get Your Password

ABOUT US
- Introduction
- Careers With Us
- Contact Information
- Advertise

Weekly Report http://www.yahoo.com

| Day | Tue | Wed | Thu | Fri | Sat | Sun | Mon | Weekly Total |
|---|---|---|---|---|---|---|---|---|
| Date | 12/07 | 12/08 | 12/09 | 12/10 | 12/11 | 12/12 | 12/13 | |
| Outages | 0 | 0 | 0 | 0 | 0 | 0 | 0 | 0 |
| Time on error | 00:00 | 00:00 | 00:00 | 00:00 | 00:00 | 00:00 | 00:00 | 00:00 |
| % Uptime | 100.0 | 100.0 | 100.0 | 100.0 | 100.0 | 100.0 | 100.0 | 100.0 |
| Connect time * | 0.11 | 0.11 | 0.11 | 0.11 | 0.11 | 0.11 | 0.11 | 0.11 |

* Average in Seconds

Home | Careers With Us | Link To Us | Services Agreement | Privacy Policy | Contact Us © 2001-2005 InternetSeer.com. All Rights Reserved.

FIG. 11

Email ID: AutoActivate
Number of emails sent: 100,000+
Number of e-mails the recipient received before receiving this e-mail: 0
Audience: People who registered a URL with Claymont.com Subject:
Congratulations. Your web site is registered Body:
Congratulations! You have submitted your Web site to the
Claymont.com search engine and Web site monitoring service.
Your Web site has been registered.  ←— 1301

In order to ensure the integrity of our search results,
Claymont.com remotely monitors every Web site that is registered at
Claymont.com. This allows Claymont.com to keep its search
results accurate by removing non-responding Web sites from its directory.

Claymont.com has joined with InternetSeer.com to conduct this ongoing
monitoring. As part of this service, InternetSeer will monitor your
Web site every hour, 24-7, and will notify you by email when your site   ←— 1302
is not responding. In addition, InternetSeer will send you weekly reports
displaying the performance of your Web site over the previous week.
There is NO CHARGE for this service.

For your convenience, we have provided you with a login name and password
that allows you to manage your account profile.

Your login Name: mark@minddrivers.com
Password is: 77Oodg94
URL being monitored: http://www.claymont.com

FIG. 13A

For more information on InternetSeer, please visit http://www.internetseer.com
and for Claymont.com please visit http://www.claymont.com.

Kane Bender
Kane@Claymont.com

If you did not submit your Web site and would prefer not to receive emails
From Claymont.com put the word "Remove" in the subject line and reply to
This email without editing the content. If you orefer not to be subscribed
To InternetSeer for Web Site monitoring, you can be removed from this
Service by returning this email with the word "STOP" ion the subject line.

1303

FIG. 13B

HTTP://WWW.SMALLBUSINESS.COM/JAVA/SHOWINFO.JSP?PRODUCT=63452

| CATEGORY | VALUE | WEIGHT |
|---|---|---|
| TOP LEVEL DOMAIN | COM | 3 |
| KEYWORD | JAVA | 1 |
| DYNAMIC CONTENT | YES | 1 |
| QUERY STRING | YES | -1 |
| FILE EXTENSION | JSP | 1 |

FIG. 19

METHOD OF REMOTELY MONITORING AN INTERNET WEB SITE

FIELD OF THE INVENTION

This invention relates to methods of remotely monitoring sites located on a global communications network and sending an electronic notification reporting on the site's performance and, in particular, indicating the status of errors detected on the site during the monitoring process. This invention also relates to methods of acquiring and retaining subscribers to and customers of a service which remotely monitors sites located on a global communications network.

BACKGROUND OF THE INVENTION

Sites supported by the World Wide Web and accessible through the Internet have become a very popular way for many businesses and individuals to offer goods and services. Advances in technology have enabled dramatic increases in Internet connection speeds and computer power as well as decreases in cost, thereby opening the door for small businesses to build an online presence and allowing such small businesses to compete on a level playing field with larger companies. Indeed, the number of small businesses that operate Web sites continues to increase at a steady pace.

For some companies, particularly small companies, the Web is the principal, or perhaps only, manner for advertising and/or offering their goods and services. In addition to maintaining their own Web sites, many companies pay third parties to advertise their goods and services on the third parties' Web sites. Still others create links to and from third party Web sites, thereby establishing relationships with strategic Web partners and increasing traffic to their sites. For these reasons and others well known to those skilled in the art, continuous accessibility and error free operation of a company's Web site, and the Web sites of those that are linked to or affiliated with the company, are critical to maintaining a viable Web based business.

Studies show that, on average, many Web sites experience some type of error event approximately once every two months. For many reasons, there exists a need for companies to identify any instances in which their sites (or those of third parties) are experiencing errors. For example, if an error on a site is detected, attempts to resolve such error can be made. In addition, many companies who advertise on others' Web sites may tolerate only a minimal time period during which such sites are experiencing errors. Similarly, companies building alliances with other Web-based businesses or investing in such businesses may require that a Web site be experiencing minimal or no errors for a certain percentage of time prior to beginning a relationship with such Web-based business or continuing such a relationship. Moreover, Web-based businesses may be interested in learning that the percentage of error-free time for their Web site is very small. This type of information could serve as a valuable marketing tool. Along these same lines, companies may be interested in learning about the Web site difficulties or successes of their competitors.

Thus, there exists a need for Web site monitoring services to enable users to track and evaluate the performance of their Web sites or the Web sites of others. At present, there are two different varieties of Web site monitoring services, remote monitoring and on-site monitoring. Many companies currently providing remote monitoring services present a relatively complex offering of services and may charge relatively high fees for such services. Thus, such remote monitoring services likely focus on serving larger Web-based businesses. On-site monitoring involves use of software that is either downloaded or installed and resides on the customer's servers. Such software is used to monitor systems, intranets and test loads on the customer applications. On-site monitoring software applications typically involve relatively high up front costs in addition to monthly license fees. Thus, on-site software is not a practical solution for small businesses with a limited budget. In general, such software usually monitors only the systems of the particular customer that has installed the software on its servers and does so locally, not remotely. Thus, such software does not provide a comprehensive monitoring solution.

Therefore, there exists a need for a free service which remotely monitors the operation of potentially all Web sites accessible via the Internet and reports the results of such monitoring in a convenient fashion to any party which may be interested in such information. The need is particularly acute for small businesses of limited resources, which depend on the relatively continuous and error-free operation of their Web sites to succeed.

In addition to this identified need, there exists a need on the part of monitoring service providers to reach the market of potential service recipients in an effective, scalable and cost efficient manner. Traditional methods of identifying, acquiring and retaining customers include, for example, direct advertising to target audiences. However, such methods are less than desirable because they may not reach a large enough audience, are relatively expensive to employ on a per customer basis, and result in relatively low customer acquisition and growth rates. Thus, the need for a comprehensive method of identifying potential recipients of monitoring services and a low cost, rapidly scalable method of acquiring customers which results in high retention rates and recurring revenue is apparent.

SUMMARY OF THE INVENTION

A method of performing a service of remotely monitoring a site located on a global communications network includes monitoring the site for an error and sending a notification to a representative of a proprietor of the site in the event an error is detected on the site. The notification is sent, at least initially, without advance permission of the representative of the proprietor for at least an initial time period. In addition, a fee is not charged for the monitoring service for a free time period.

A method of performing a service of remotely monitoring a site located on a global communications network includes monitoring the site for an error and sending a notification to a representative of a proprietor of a site which is linked to the site being monitored, in the event an error is detected on the site. The notification is sent, at least initially, without advance permission of a representative of a proprietor of the site and/or of a representative of a proprietor of the linked site for at least an initial time period. In addition, a fee is not charged for the monitoring service for a free time period.

A method of performing a service of remotely monitoring a site located on a global communications network includes monitoring the site for an error and sending a notification to an interested third party in the event an error is detected on the site. The notification is sent, at least initially, without advance permission of the representative of the proprietor of the site and/or of the interested third party for at least an initial time period. In addition, a fee is not charged for the monitoring service for a free time period.

The interested third party is any party other than a representative of a proprietor of the site. In particular, the interested third-party can be an entity which offers one or more products or services which are similar to one or more products or services offered on the site; an entity which advertises products on the site; a consumer of products or services offered on the site; an entity which has a financial interest in the site; an entity which sells advertising space on the site; a press member; or an entity advising a third party who has an interest in the site.

In accord with one aspect of the invention, the notification is sent after expiration of the initial time period only upon granting of permission by either the representative of the proprietor of the site; by the representative of the proprietor of the linked site; and/or by the interested third party. In some aspects of the invention, an offer of enhanced services is included in notifications sent after the granting of permission.

The monitoring may include an attempt to download a header (all or a portion) from the site being monitored and detecting an error if the attempt is unsuccessful. Alternatively, the computer programming language and/or graphics, or the entire page, of the site may be included in the download attempt. These monitoring steps may be repeated at regular intervals. When the monitoring service detects that any error previously detected has been corrected, a notification may be sent to a representative of the proprietor of the site; to the representative of the proprietor of the linked site; and/or to the interested third party. The monitoring may be performed from a variety of locations, in a cycle or otherwise.

A method of identifying at least one appropriate electronic mail address to which a notification is sent upon an occurrence of an error in a site, located on a global communications network, which is being monitored for the occurrence of errors, includes extracting at least one electronic mail addresses from the site. Each electronic mail address extracted is assigned one or more categories and a priority. At least one appropriate electronic mail address to which the electronic notification is sent upon the occurrence of the error in the site is identified, based upon the priority assigned. The notification is performed, at least initially, without the advance permission of a representative of a proprietor of the site. In addition, a fee is not charged for the monitoring.

The categories may be assigned based on a variety of factors including the domain of the electronic mail address; the subject matter of the electronic mail address; and the location of the electronic mail address on the site. The priority is assigned based on the weights assigned to each category assigned to the electronic mail address. The notification may cease being sent upon receipt of a predetermined response from a user associated with the appropriate electronic mail address.

A method of enrolling a subscriber in a service, which remotely monitors a site located on a global communications network for errors and which sends a notification to an electronic mail address upon detecting an error on the site, includes identifying an electronic location address of the site upon submission of the electronic location address to a search engine service. A proprietor electronic mail address associated with a representative of a proprietor of the site is assigned upon submission of the electronic mail address to the search engine service. The electronic location address is automatically included in a database of electronic location addresses associated with one or more additional sites which are located on the global communications network and which are monitored by the monitoring service. The proprietor electronic mail address is automatically identified as the electronic mail address to which a notification is sent upon the detection of an error on the site by the monitoring service.

A method of enrolling a subscriber in a service, which remotely monitors a site located on a global communications network for errors and which sends a notification to an electronic mail address upon the occurrence of a site event, includes identifying one or more potential electronic location addresses upon submission of an electronic location address to a domain name registry service for registration. A proprietor electronic mail address associated with a representative of a proprietor of the site is assigned upon submission of the electronic mail address to the domain name registry service. The potential electronic location addresses are automatically included in a database of electronic location addresses associated with one or more additional sites which are located on the global communications network and which are monitored by the monitoring service. The proprietor electronic mail address is automatically identified as the electronic mail address to which the notification is sent upon the occurrence of the site event. The site event may correspond to registration of the electronic location address with the domain name registry service; may occur when the site becomes accessible by users of a global communications network; or may correspond to detection of an error in the site by the monitoring service.

A method of generating a list of at least one recipient of a remote monitoring service, which detects one or more events on a site located on a global communications network is at least initially generated without advance permission from the recipient. The list is usable for a number of commercial purposes in addition to the monitoring service. The monitoring service is rendered by a service provider without payment by the recipient. In addition, the service is rendered to the recipient continually until the occurrence of a terminating event. The terminating event may be the receipt by the service provider of a request by the recipient to terminate the monitoring service or a failure of the service provider to receive a response from the recipient.

BRIEF DESCRIPTION OF THE ILLUSTRATED EMBODIMENTS

A more complete understanding of the invention may be obtained by reference to the drawings in which:

FIG. 3 illustrates an example of an electronic mail notification.

FIG. 4 illustrates an example of an electronic mail notification.

FIG. 5 illustrates an example of an electronic mail notification.

FIG. 6 illustrates an example of an electronic mail notification.

FIG. 7 illustrates an example of an electronic mail notification.

FIG. 8 illustrates an example of an electronic mail notification.

FIG. 9 illustrates an example of an electronic mail notification.

FIG. 10 illustrates an example of a periodic Web site performance report sent via e-mail.

FIG. 11 illustrates an example of a periodic Web site performance report accessible via a web site.

FIG. 13 illustrates an example of a search engine co-enrollment electronic mail notification.

FIG. 19 illustrates an example of a sample category/weight chart.

DETAILED DESCRIPTION OF THE INVENTION

Figure 1:
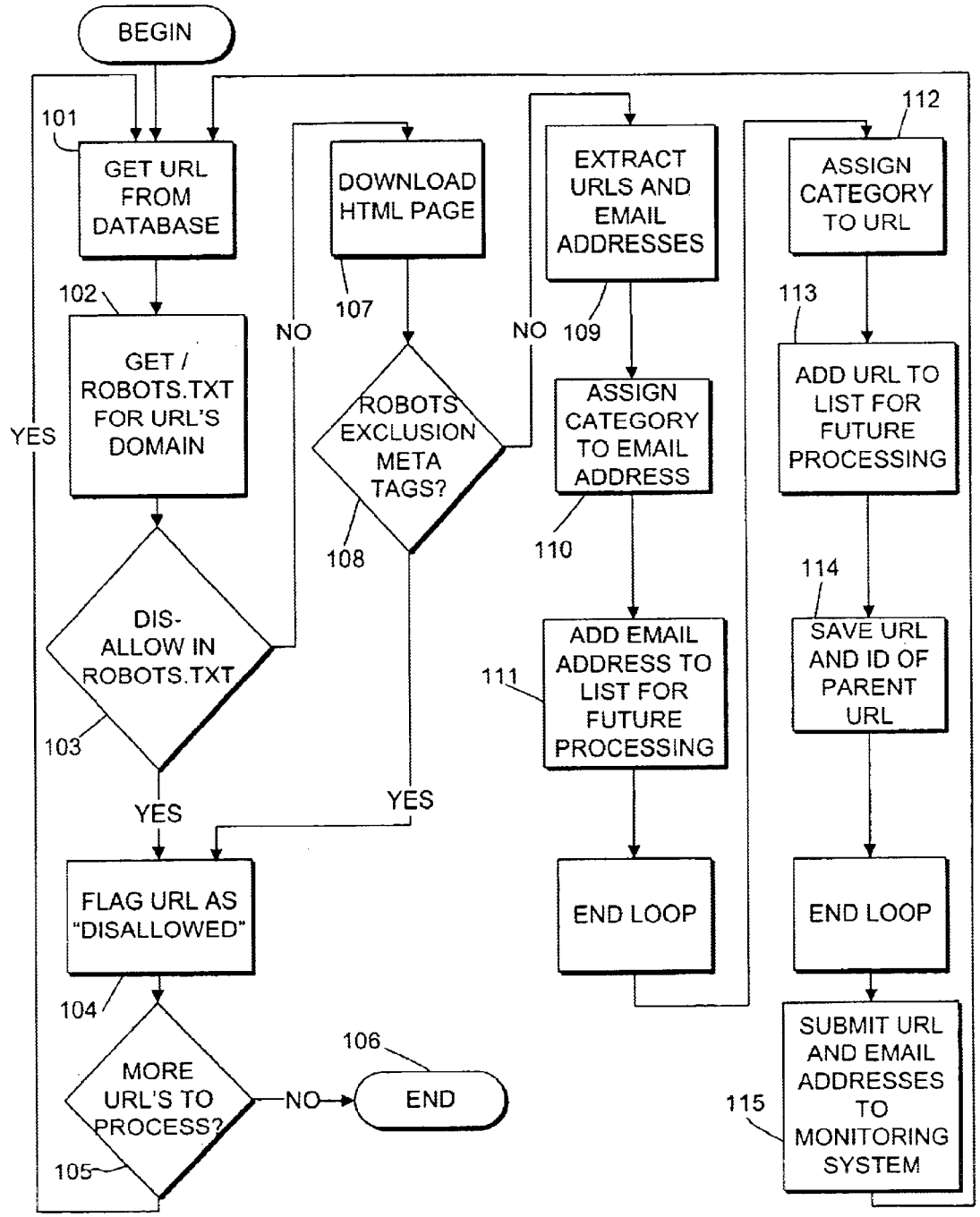
FIG. 1 illustrates a flow diagram of the Web mapping process of a preferred embodiment of the present invention.

As used herein: "electronic mail" or "e-mail" refers to the transmission of messages over communications networks, which e-mail systems may be confined to a single computer system or which have gateways to other computer systems; "global communications network" refers to a network such as the Internet; "HTML" or "hypertext markup language" refers to the authoring language used to create documents on the World Wide Web, which defines the structure and layout of a Web document by using a variety of tags and attributes; "META tag" refers to an HTML tag that provides information about a Web page, which does not affect how the page is displayed but instead provides information such as who created the page, how often it is updated, what the page is about, and which keywords represent the page's content; "spider" or "spidering" refers to a program that automatically fetches URLs associated with pages on the Web; "top level domain" refers to the suffix attached to Internet domain names, for example, .com, .gov, .net, .org, .uk, and .ca; "uniform resource locators" or "URL" refers to an address of a certain page, file or directory on the Web; and "World Wide Web" or "Web" refers to a system of Internet servers that support specially formatted documents, referred to as "Web pages."

In accordance with a preferred embodiment of the present invention, a database of URLs is developed by way of a Web mapping process. In particular, the database of URLs is created by first developing an initial list of selected URLs. The Web pages associated with the initial list of URLs are then subjected to a robot, preferably an Internet spidering application developed using, for example, PERL, TCL, or Java. The spidering application downloads a Web page and extracts all of the hypertext links to other URLs found on that page, thereby identifying additional URLs. As the spidering process continues, a master list of URLs is propagated, along with the links that connect one URL to another. The URLs identified by the spidering process, and the links that connect them, are saved in a database. Both the full URL and the parent URL are saved.

Each URL in the database is assigned a category based on a number of factors. Some examples of these factors are as follows. URLs containing identified category keywords are assigned a predefined category. URLs whose content contains identified category keywords in the META keywords and description tags are assigned a predefined category. URLs whose content contains at least three unique international characters (e.g., ü, ñ, á, æ, ç, è) are categorized as being in a language other than English. URLs containing exactly one tilde character (~) are categorized as being an individual's personal Web page. URLs ending with file extensions known to be dynamic content (e.g., .jsp, .asp, .cgi, .dll) are categorized as being dynamic. HTML resources containing META "charset" tags are categorized by character set (e.g., <META HTTP-EQUIV="Content-Type" content="text/html; charset=gb_2312-80"22 refers to simplified Chinese). HTML resources containing the "lang" attribute in their <HTML> tags are categorized by language, as set forth by the ISO 639 standard. For instance, <HTML lang="fr"> indicates that the Web page was written in French. A category is assigned to each URL based on its top-level domain. For instance, the URL http://www.instra.com.au/faq.htm would be assigned the domain category "com.au". A category is assigned to each URL based on Web server keywords found in the HTTP server headers (e.g., "Server: Microsoft-IIS/4.0" is assigned the "IIS" web server category). A category is assigned to each URL based on operating system keywords found in the HTTP server headers (e.g., "Server: Apache/1.3.14 (Unix)" would be assigned the "Unix" operating system category). Each category has a weight associated with it. A priority is assigned to each URL based the weights of the URL's assigned categories. For example, in one embodiment, the weights may be added to determine priority. A sample chart showing categories and their associated weights for an exemplary URL is shown in FIG. 19.

Figure 18:
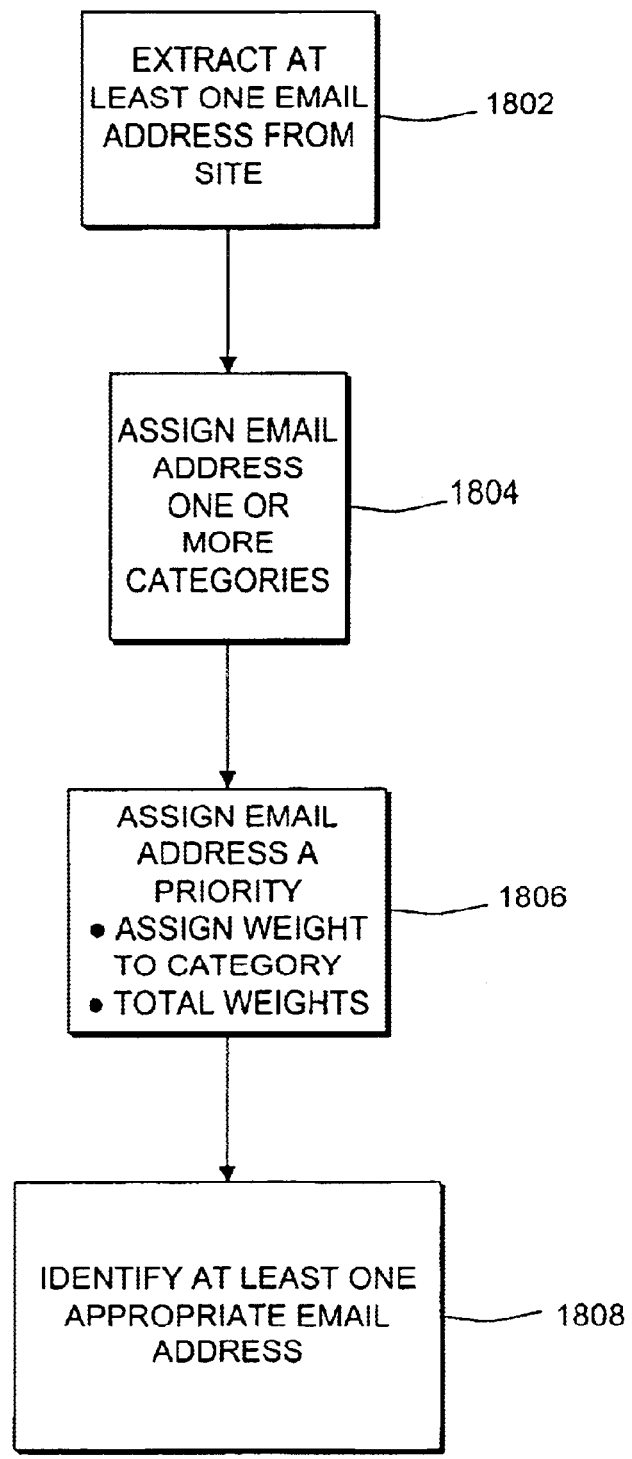
FIG. 18 illustrates a flow diagram of the e-mail address identification process.
Figure 20A:
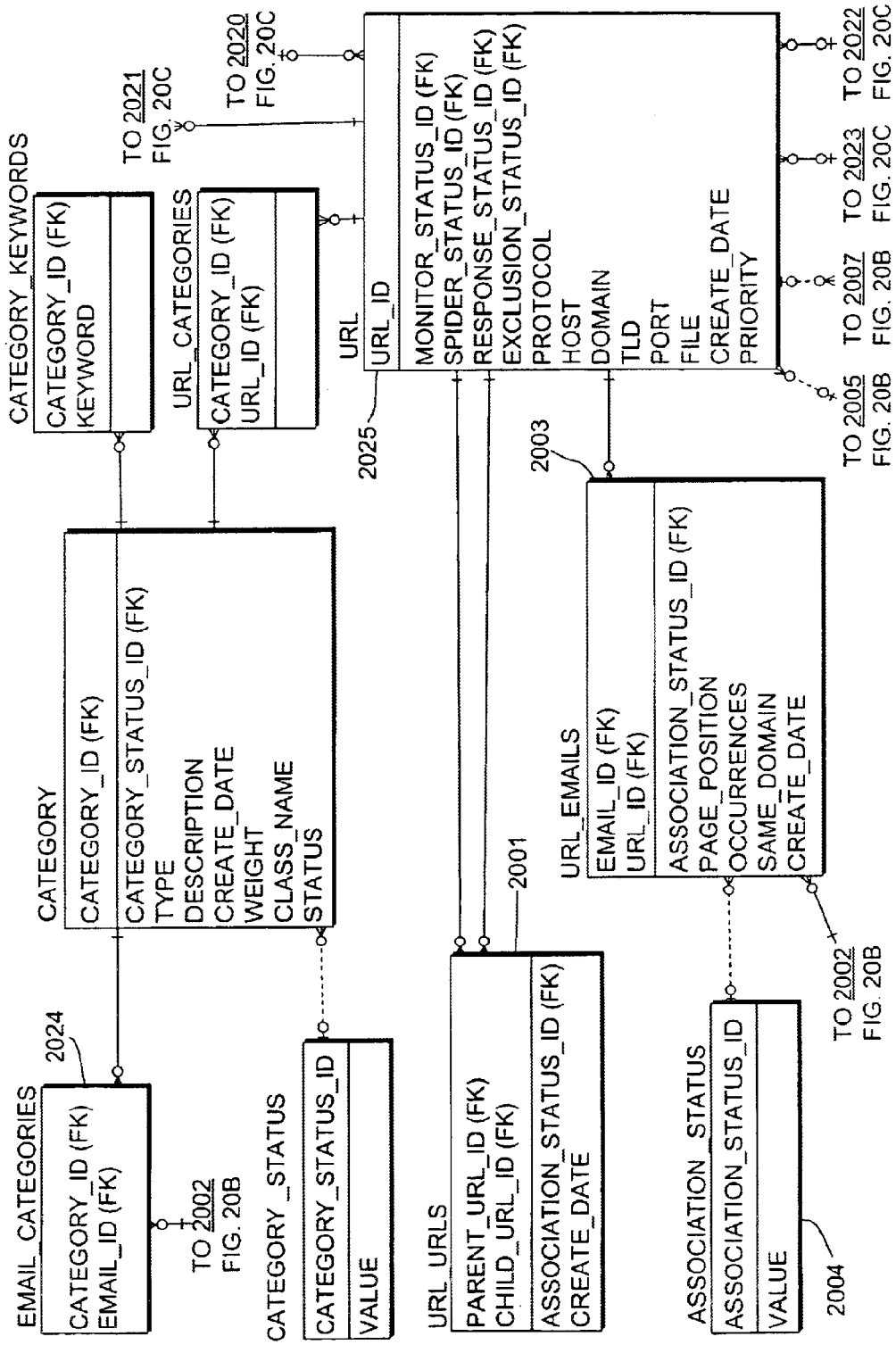
FIG. 20 illustrates a data model of a preferred embodiment of the present invention.
Figure 20B:
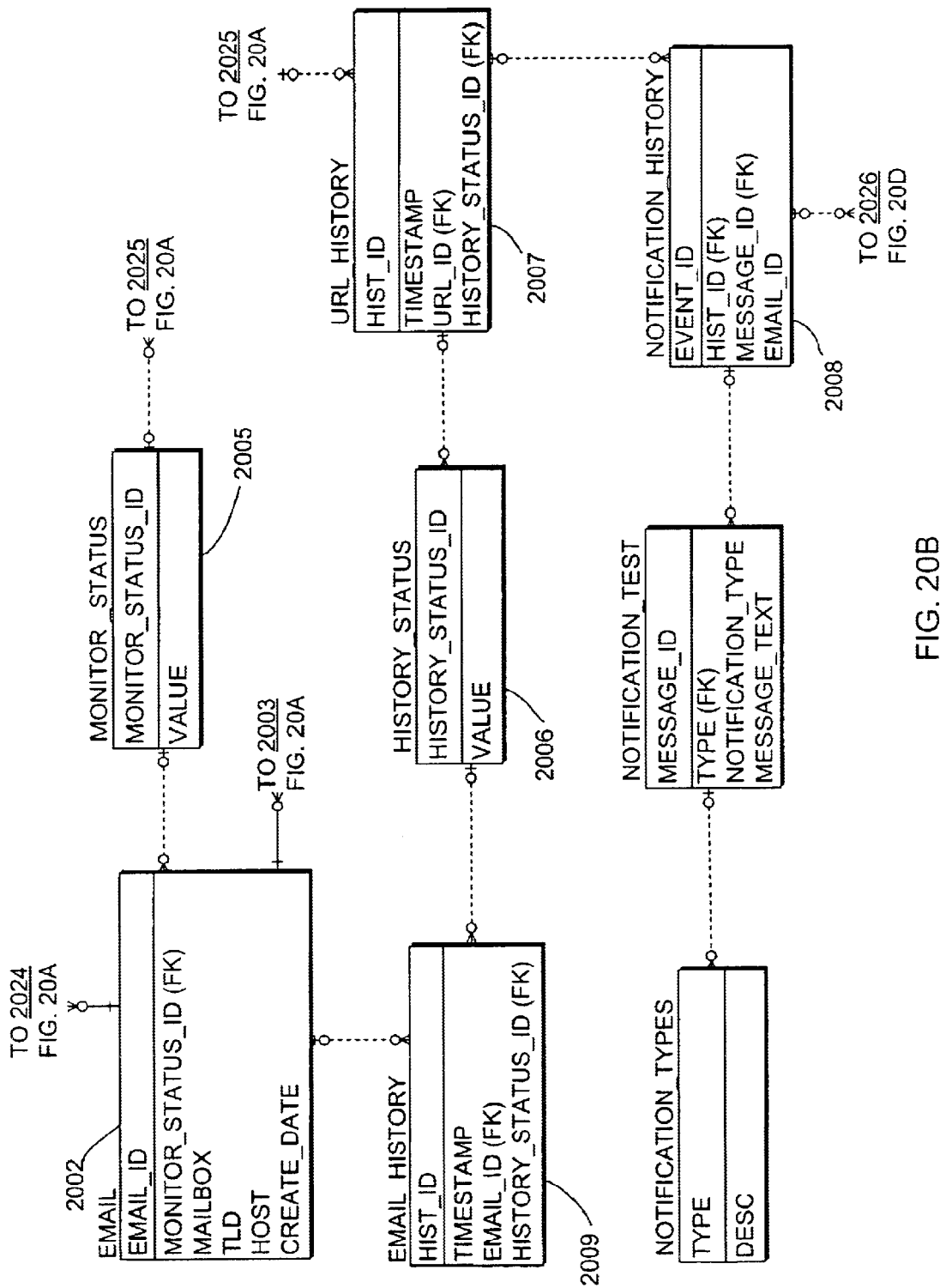
Figure 20C:
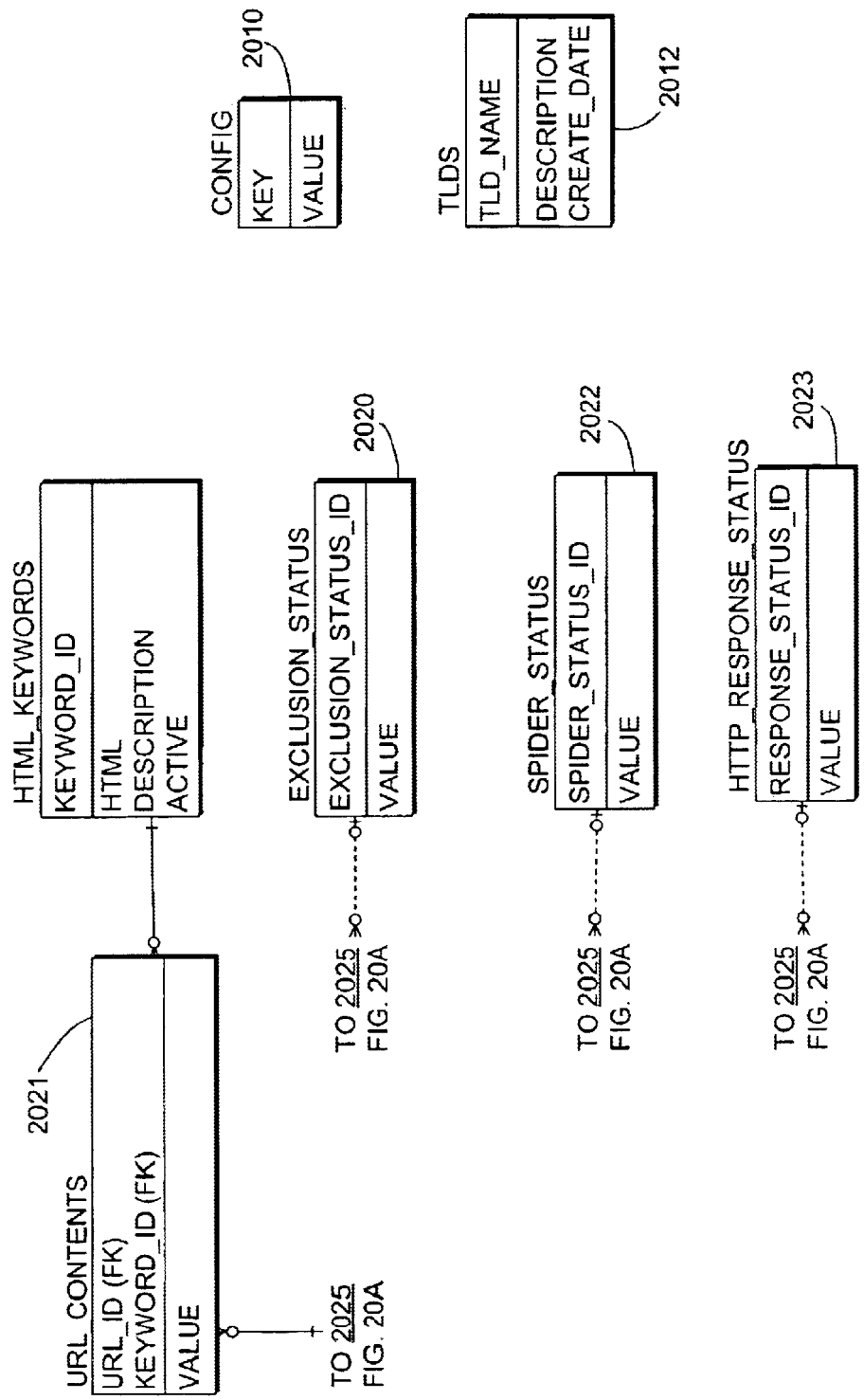
Figure 20D:
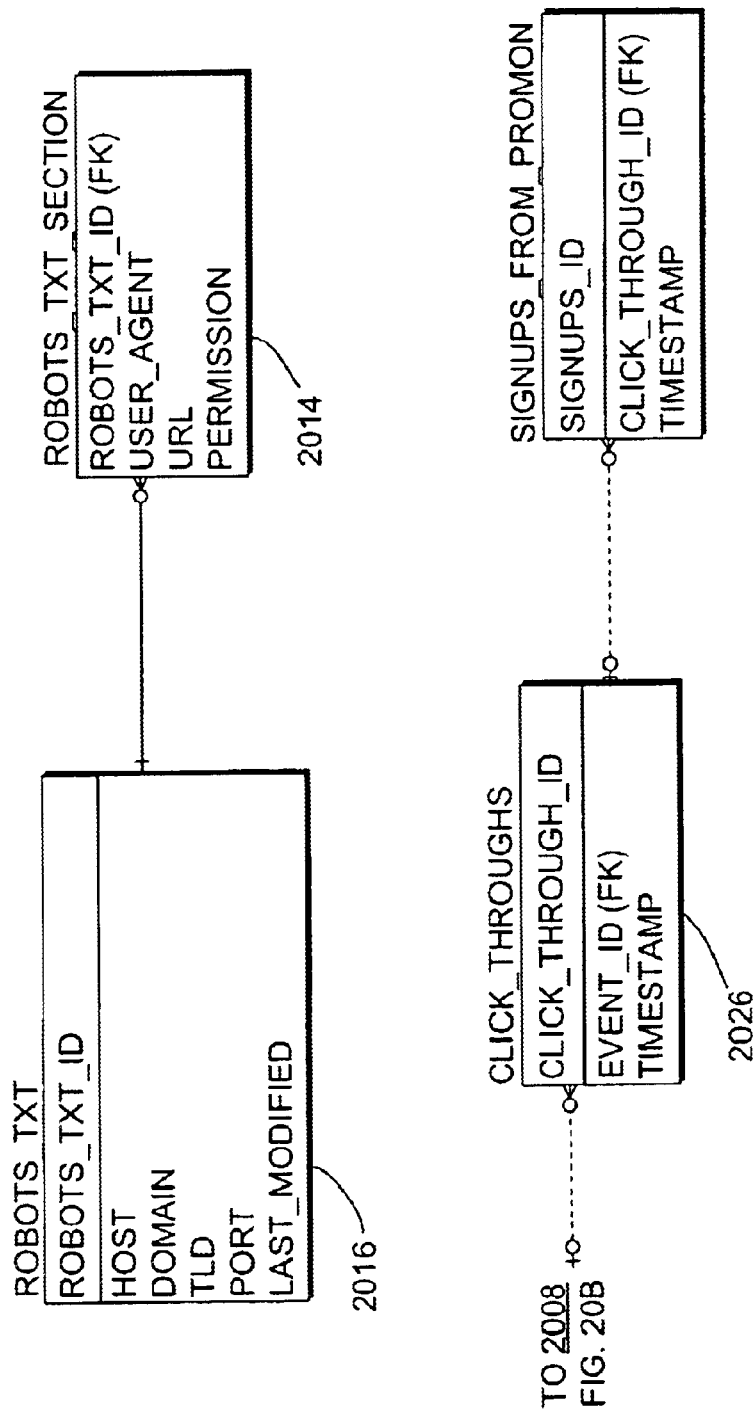

The process for identifying the appropriate electronic mail address to send a notification regarding events occurring on a site is depicted by the flow diagram in FIG. 18. In addition to extracting URLs, the spidering application extracts in step 1802 each electronic mail address it identifies on each Web page spidered. Each electronic mail address is identified as being associated with the URL corresponding to the page on which the electronic mail address was identified and is saved on a database. Each electronic mail address associated with each URL is categorized in step 1804 and assigned a priority in step 1806. Electronic mail address categories are assigned based upon several factors including, for example, whether the electronic mail address has the same domain as the URL associated with it; the subject matter of the electronic mail address (e.g., career, customer service, technical support, information, jobs, legal, questions, sales or Webmaster related); and/or the position of the electronic mail address on the page of the site. Other factors may also be considered. Each of the categories is weighted and a priority is assigned. For example, in one embodiment, the weights may be added to determine priority. Based upon the priority assigned, one or more electronic mail addresses are identified as the appropriate electronic mail address(es) to contact for events occurring on a specified URL in step 1808. The electronic mail address(es) identified may be associated with some representative of the proprietor of the site, which includes the proprietor himself. In the event that one particular electronic mail address is identified as the appropriate electronic mail address to contact for events occurring on more than one URL, such electronic mail address may be assigned a different priority for each URL to which it is assigned.

In accordance with a preferred embodiment of the present invention, certain URLs are flagged as disallowed during the database development and Web mapping process. For example, any URL corresponding to a Web site which includes a file (such as a robot.txt file) indicating that certain resources on the site are not to be accessed by robots are flagged as disallowed. Also, certain pages of a Web site may include META tags indicating that robots are not to access that resource. URLs associated with these pages are similarly flagged as disallowed.

The spidering process is implemented periodically with respect to the URLs in the database, thereby updating and adding to the database of URLs, links and associated electronic mail addresses. Each URL identified and links to and from it are saved in a URL table. This information is stored, for example, in table 2001 of FIG. 20. Each electronic mail address identified is saved in an electronic mail address table. This information is stored, for example, in table 2002 of FIG. 20. Each electronic mail address and corresponding URL is saved in a URL/electronic mail address assignment table. This information is stored, for example, in tables 2003 and 2004 of FIG. 20.

With further reference to FIG. 20, table 2010 holds information relating to the parameters of the monitoring system. Table 2012 contains information relating to the top level domain names identified during the spidering process, including a description and the date each was found by the spider. Tables 2016 and 2014 hold information pertaining to any robots.txt files identified during the spidering process, including the URLs on which such files were found.

FIG. 1 provides an overview of the Web mapping process and, in particular, of the method by which the database of URLs and associated electronic mail addresses is developed in accordance with one embodiment of the present invention. In step 101, a URL is selected from the initial list of URLs. In step 102, the URL is reviewed to determine whether robots, such as spiders, are disallowed. If spidering is disallowed in step 103, the URL is flagged as disallowed in step 104 and, if there exist more URLs to process in step 105, the process begins again at step 101. If there exist no additional URLs to process in step 105, the process is complete at step 106. If spidering is not disallowed, the HTML of the page is downloaded in step 107. If META tags, which exclude spidering, are detected during the download in step 108, the URL is flagged as disallowed in step 104. If such META tags are not detected during the download in step 108, electronic mail addresses and additional URLs are extracted from the page in step 109. In step 110, each electronic mail address is assigned a category. In step 111, each electronic mail address is added to a list for future processing. Each URL is assigned a category in step 112, and added to the list for future processing in step 113. The URL and identification of the parent URL are saved in step 114. All URLs and electronic mail addresses which are not flagged during the process are submitted to the monitoring system in step 115.

Figure 2A:
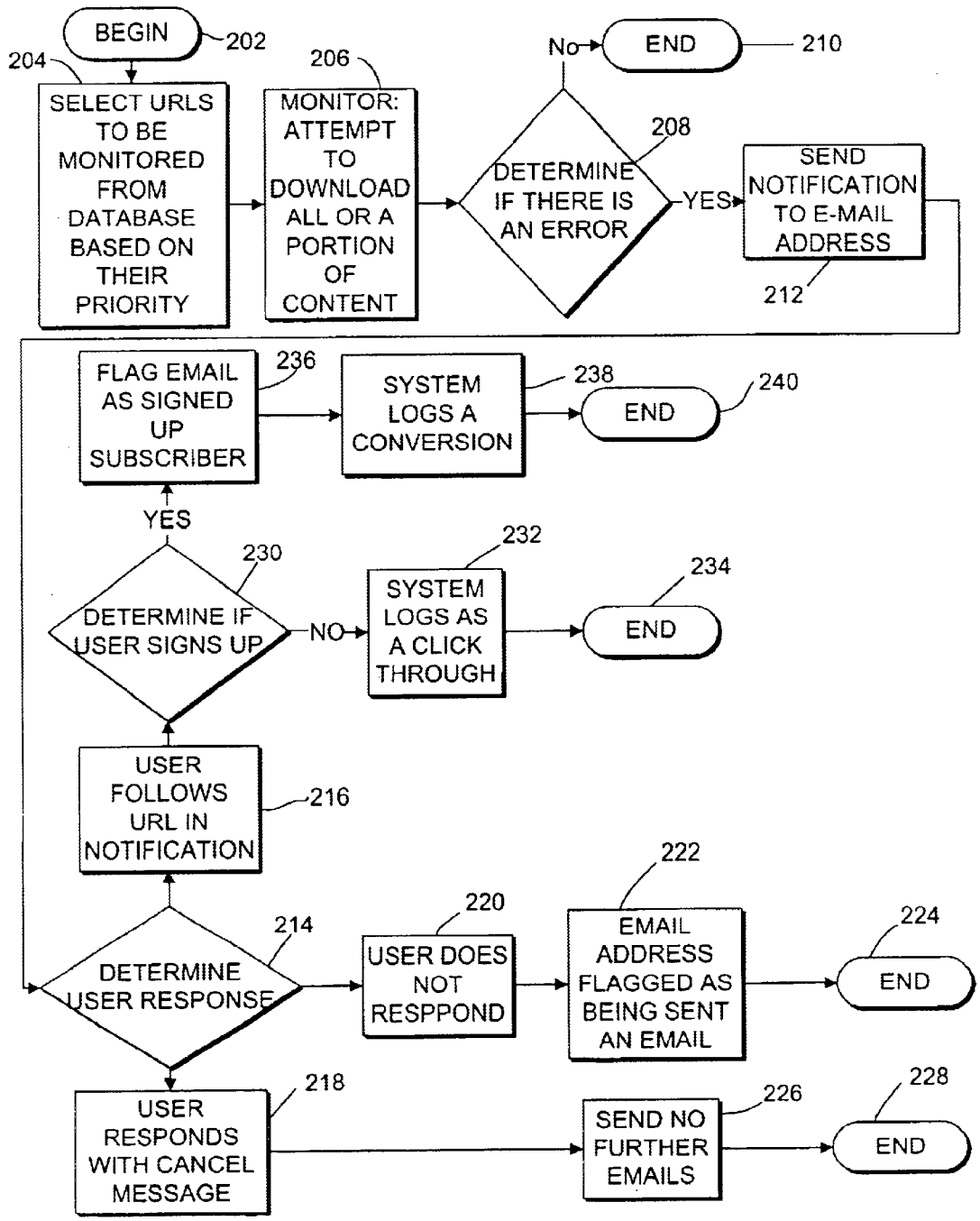
FIGS. 2A and 2B illustrate a flow diagram of the monitoring system of a preferred embodiment of the present invention.

In one embodiment, the monitoring system is developed using Sun Java JDK 1.2 and runs on Solaris, which connects to an Oracle 8i Enterprise Server. A preferred embodiment of the monitoring process is described as follows with reference to FIG. 2A. The monitoring is performed, in the preferred embodiment, every hour beginning in step 202. In other embodiments, the monitoring process may begin more or less frequently. The URLs to be monitored are selected from the database in step 204 based on their priorities. The URL is first assigned one or more categories as shown in step 112 of FIG. 1, each category having an associated weight. A priority is assigned based on the weights of each of the URL's assigned categories. The monitoring is performed in step 206 by attempting to download all or any portion of a page associated with the URL. For example, a header (all or a portion) of the page alone may be included in the download attempt. By way of further example, the computer programming language, such as HTML, and/or the graphics from the page may be included in the download attempt. Alternatively, an attempt is made to download the entire page. In step 208, it is determined whether an error has occurred. An error event is experienced, for example, if the host name in the URL cannot be resolved to an IP address; if a connection is made to the Web server and the Web server returns a response code greater than 399; or if a connection is made to the Web server and the Web server does not return the requested header or URL content within a specified period of time.

In some embodiments, quality control mechanisms are used to ensure the integrity of the monitoring process. For example, upon the detection of an error event on a given URL, two additional download attempts may be made to confirm the error event.

If the URL is not experiencing an error, the process is completed in step 210. Upon the occurrence of an error event on a particular URL, an electronic notification is sent in step 212, using for example Microsoft SMTP, to at least one of the appropriate electronic mail addresses assigned to the URL based on the priority assigned to the electronic mail address, as discussed with reference to FIG. 18. For example, the electronic notification may be sent to an electronic mail address associated with the URL and assigned a priority of 1. Alternatively, an electronic notification may be sent to two electronic addresses associated with the URL, one assigned a priority of 1 and one assigned a priority of 2, such priorities being assigned based on the weights (for example, the sum of the weights) assigned to the URL's associated categories. In a preferred embodiment, only a predetermined limited number of electronic mail notifications are sent to a particular electronic mail address over a certain period of time so as not to bombard any one particular recipient with electronic mail notifications.

Upon the occurrence of an error event on a particular URL, an electronic notification may be sent, alternatively or in addition to a representative of a proprietor of a site, to a representative of a proprietor of a site which is linked to the monitored site or to an interested third party. The interested third party is any party other than a representative of a proprietor of the site being monitored. By way of example, the interested third party may be an entity which offers products or services which are similar to products or services offered on the site; an entity which advertises products or services on the site; a consumer of products or services offered on the site; an entity which has a financial interest in the site; an entity which sells advertising space on the site; a member of the press; or an entity advising a third party who has an interest in the site.

In the preferred embodiment, the initial electronic notification, such as the example shown in FIG. 3, includes a statement 301 that an error event has been detected. In addition, the electronic notification may include a mechanism 302 pursuant to which the recipient of the electronic notification can indicate that the recipient does not wish to receive further notifications, given that the initial notification is sent without the advance permission of the recipient. The electronic notification preferably includes a mechanism by which the recipient of the electronic notification may register for continued monitoring services. For example, as shown in FIG. 3, the electronic notification may include a link 303 to a Web site page which includes a registration form. The registration form may require that the user enter the URLs of the Web sites they want to have monitored (up to a certain number, e.g., two); the electronic mail address to which error notifications should be sent; and a password to activate the user's account. Additional information such as job title, nature of the business and size of the company may also be required. Upon subscribing to the Web site monitoring service, an electronic error notification, such as that shown in FIG. 4, is sent upon the detection of an error on the site.

Once the notification is sent in step 212, the user response is determined in step 214. If the user responds by indicating that it does not wish to receive any further notifications (such as, for example, including the term "cancel" in the subject field of a reply e-mail or by any other means as directed by the service provider) in step 218, the electronic mail address is flagged in step 226 and the process is completed in step 228.

If the user responds by following the URL in the notification in step 216, a determination must be made in step 230 as to whether the user signs up for the monitoring service. If the user does not sign up for the monitoring service, in step 232 the system logs the visit as a click through and the process is done in step 234. If the user signs up for the service, in step 236 the system flags the electronic mail address as signed up and, in step 238, the system logs the visit as a conversion and the process is completed in step 240.

Preferably, if the recipient simply does not respond to the electronic notification in step 220, the URL is tagged in step 222 with a numeric indication that a notification has been sent to the recipient and the recipient did not respond and the process is completed in step 224. While an additional notification may be sent to that recipient indicating that the site is off error, further electronic mail notifications regarding future errors may not be sent to that user with respect to that URL for some predetermined period of time. For example, an electronic mail notification for future errors will not be sent to that electronic mail address (currently assigned a value of one given that one notification has been sent and no response was received) until the monitoring service provider determines that electronic mail addresses with a numeric value of more than one will be sent notifications in the event their sites are on error.

Figure 2B:
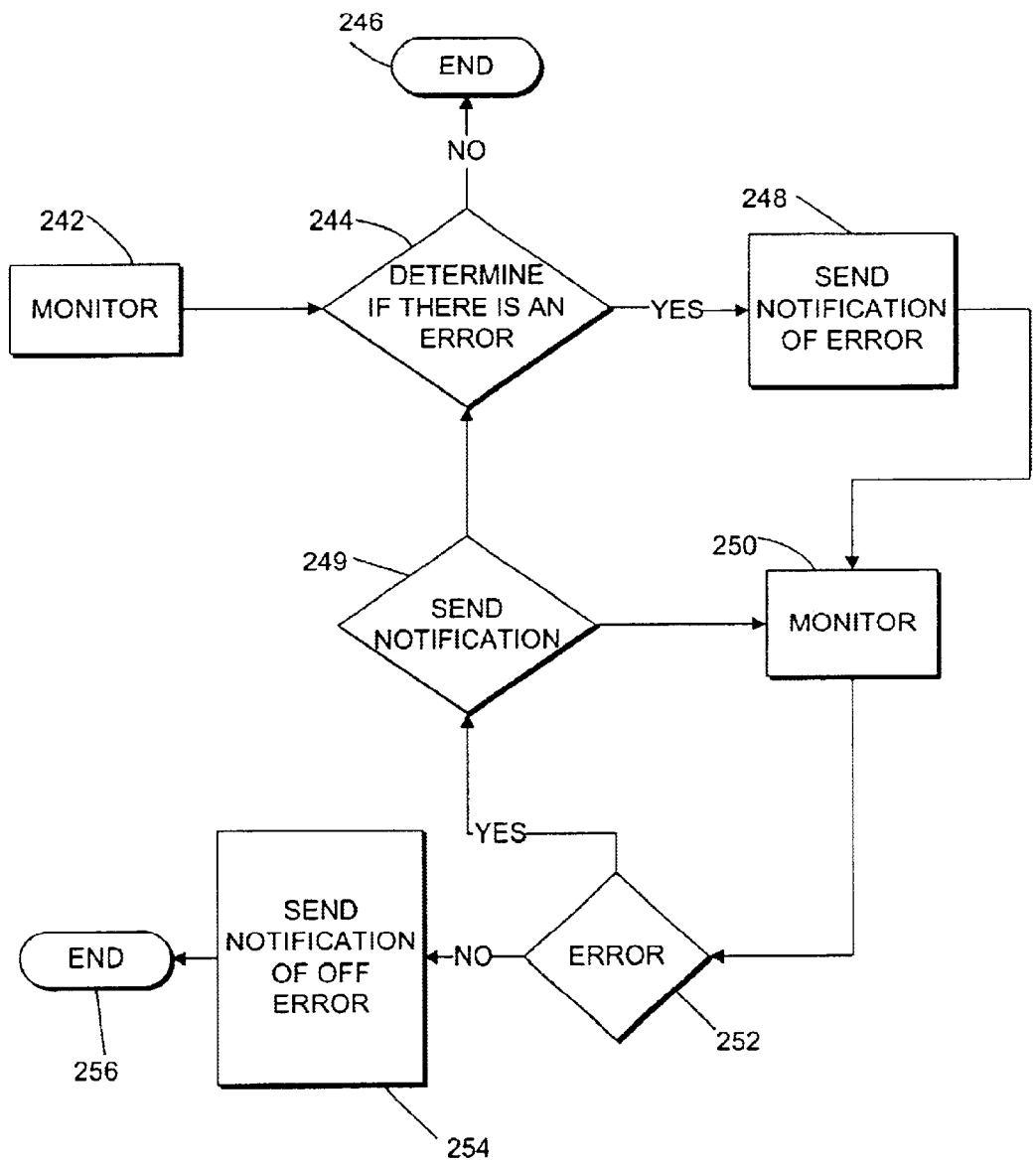

With reference to FIG. 2B, after the monitoring process is commenced in step 242, and it is determined whether there is an error in step 244, if there is no error, the process is done in step 246. If an error exists, a notification is sent in step 248. Once the error is detected and the initial electronic notification is sent, the URL is tested periodically, for example, every one-half hour as shown in step 250. After a predetermined period of time (e.g., one-half hour), it is determined in step 252 whether the error event persists. If there remains an error, it must be determined in step 249 whether to send a second notification. If so, a second electronic notification may be sent in step 248 reporting that the error event persists. If not the monitoring continues in step 250. The cycle continues and if, after a predetermined period of time (e.g., twenty-four (24) hours), the error event persists, a third electronic notification may be sent reporting that the error event persists and regular monitoring of the site will cease. Further monitoring may be performed infrequently on long term errors such as these. When the error event ceases to exist with regard to the URL, an electronic notification is sent indicating that the error event has been resolved in step 254 and the process is complete in step 256. An example of an electronic notification indicating that the error has been resolved is shown in FIG. 4.

Some examples of electronic notifications sent to a subscriber to the monitoring service are shown in FIGS. 5, 6, 7, 8, and 9. FIGS. 5 and 6 show examples of the first error alert sent to a subscriber. FIG. 7 shows an example of a final alert sent to a subscriber. FIGS. 8 and 9 show examples of recovery notifications sent to a subscriber indicating that the URL is off error.

If after any electronic notification the user receiving such notification requests that the notifications cease, no further notifications regarding the status of the error, or any error occurring in the future, will be sent to that recipient.

In addition to the electronic notifications sent upon the occurrence of error event detection and resolution, periodic performance reports, which detail the monitoring activity on the URL, may be provided. Such reports may be, for example, weekly and include information such as the number and duration of error events, percentage of time the site is or is not on error, the amount of time required to download the HTML content of a Web page, and/or the time required to connect to the site's server. The report may be, by way of example, in the form shown in FIG. 10 or in FIG. 11. Graphs and tabular performance information displaying the performance of the URL monitored over a specified period of time may also be provided. Such reports may include information as to all monitoring tests performed, not just tests that detected an error event. The reports may also include, in some embodiments, information as to the performance of competitor's sites, status of links from or to the monitored site and the performance of the Web site as monitored from multiple geographic locations.

Figure 17:
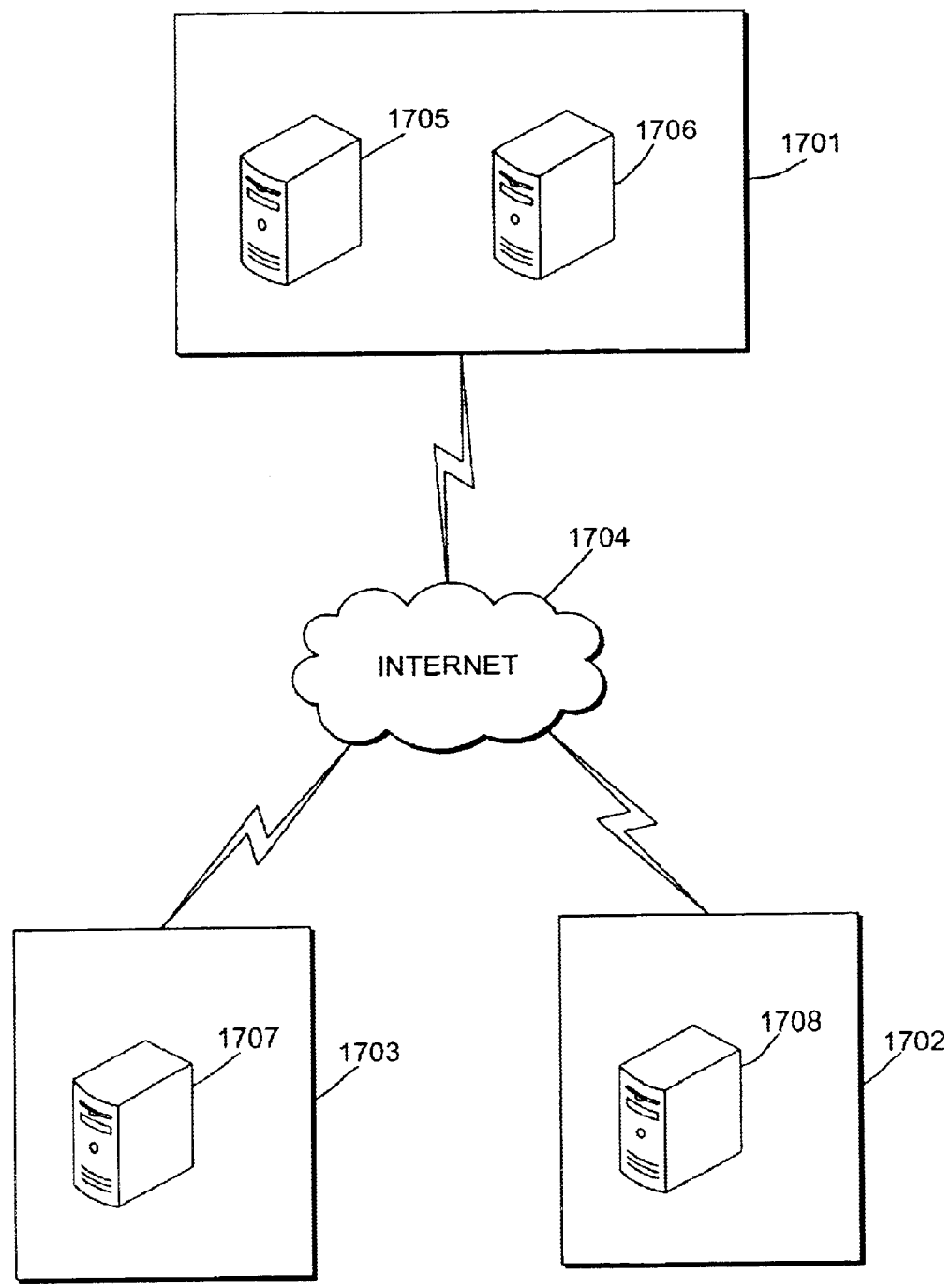
FIG. 17 illustrates the hardware associated with the monitoring system of a preferred embodiment of the present invention.

In the preferred embodiment, an electronic notification sent after the initial notification may include an offer of enhanced services. Such enhanced services may be enhanced monitoring services which allow for extensive customization of the standard monitoring service and/or provide additional services. A fee may be charged for such enhanced monitoring services. By way of example, the number of URLs monitored, as well as the frequency of the monitoring, may be increased in the enhanced monitoring service embodiment. Recipients of enhanced monitoring services may also specify critical paths to be monitored. Critical paths are a series of URLs, in order, that replicate various Web site functions, such as the path a buyer would take in ordering a product from a site. In addition, the form of the notification (such as phone, pager or electronic mail); the individuals to be contacted at various times; and the geographic locations from which the monitoring will be conducted may be customized in the enhanced monitoring services embodiment. Preferably, for example, as part of the enhanced monitoring services, the monitoring is performed from more than one location in a cyclical fashion. For example, a URL may first be monitored remotely from a location in Philadelphia, Pa., then in Chicago, Ill., then in San Francisco, Calif., and then in London, England, thereby more accurately replicating the pattern of actual visits to the Web site. A hardware diagram for accomplishing this aspect is shown in FIG. 17.

In other preferred embodiments, the enhanced services constitute third party offers of services or products or other advertising content. In addition, the enhanced services may comprise an opportunity for the user to opt-in to receive dedicated electronic mail containing targeted offers from third parties. The enhanced services may comprise, in some embodiments, an offer to allow the recipient of the notification to perform Web mapping and monitoring services on behalf of the monitoring service provider. Other offers of enhanced services may comprise additional Internet business services, including log file analysis, Web site performance evaluation and optimization, and e-mail marketing technology services.

One or more of aspects of the enhanced services may, alternatively, be included in the initial notification.

Electronic records of the monitoring activity are maintained in, for example, tables 2005, 2006, 2007, 2008, and 2009 of FIG. 20. Such records may include, by way of example, which URLs produced an error, when and for how long; and dates, times and subject matter of electronic notifications sent. Such records can be used, for example, to prepare periodic reports of Web site performance referred to herein.

Thus, the methodologies of the present invention are capable of mapping millions of Web sites and the links that connect them, proactively monitoring these sites daily and, when applicable, sending electronic mail notifications to the most appropriate contact person alerting them to the error event. The methodologies used for assigning URLs and electronic mail addresses different categories and priorities help to ensure that only entities most interested in receiving the monitoring service are sent electronic notifications. The electronic notification and response process is managed to maximize conversion of prospects to new subscribers and to minimize negative responses. In addition, these methodologies provide a trusted platform for the monitoring service provider, as well as third parties, to upsell additional services to recipients of the monitoring service.

In other embodiments, the monitoring service may be offered in connection with strategic partners, for example, other companies serving the small business market, domain name registrars, Internet service providers, hosting services, Internet consulting and Web development companies, e-commerce enablers and mass-market Internet services, such as search engines.

Figure 12:
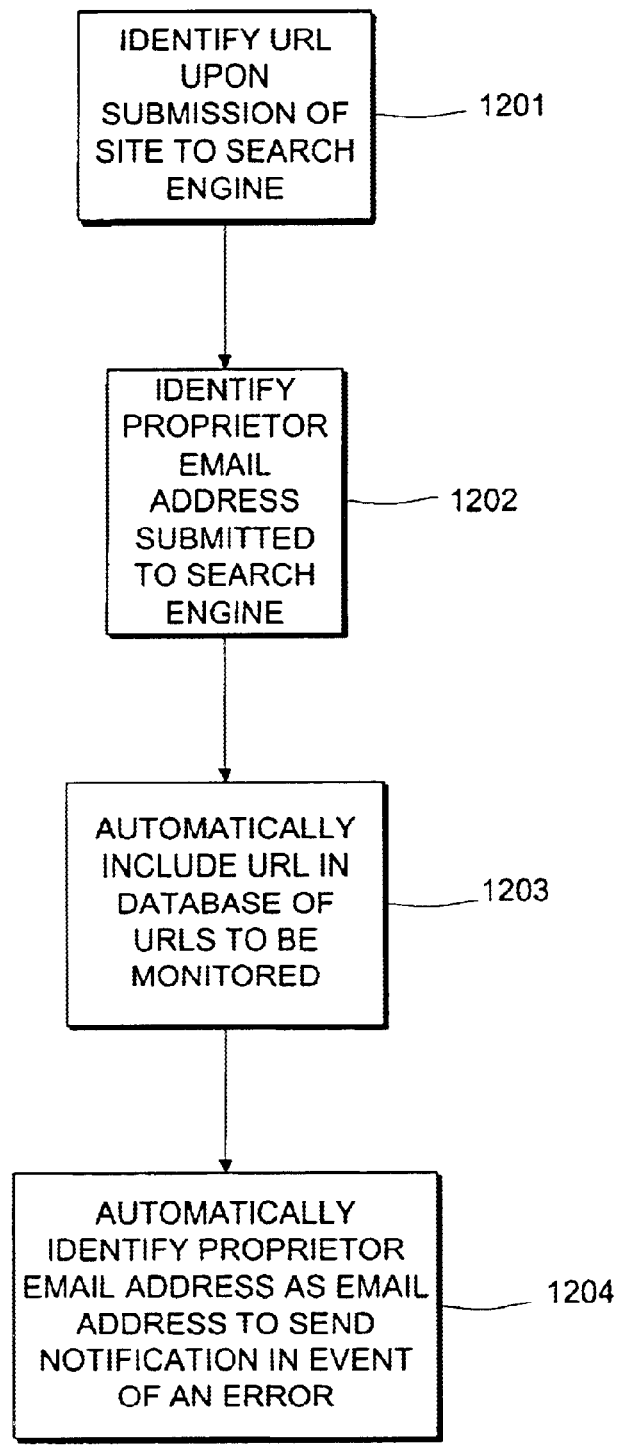
FIG. 12 illustrates a flow diagram of search engine service co-enrollment.

For example, a subscriber may automatically be enrolled in the remote Web site monitoring service of the present invention when the subscriber submits one or more URLs of one or more sites to a Web search engine service. A flow chart illustrating this process is shown in FIG. 12. With reference to FIG. 12, each URL submitted to the search engine service in step 1201 is automatically included in the database of URLs to be monitored in step 1203. The electronic mail address submitted by the subscriber in connection with each URL during the search engine service registration process is identified in step 1202 and automatically identified as the electronic mail address to which a notification is sent upon the detection of an error in step 1204. In the event the electronic mail address submitted by the subscriber to the search engine is invalid, a new appropriate electronic mail address will be identified by the spidering process described elsewhere herein with reference to FIG. 18. Any password which may be required by the monitoring service may be randomly generated and assigned. An electronic mail notification, such as that shown in FIG. 13 by way of example, may be sent to the subscriber informing the subscriber not only that the URL has been registered with the search engine service 1301, but also that the URL will be monitored and an electronic notification sent if the URL is experiencing an error event 1302. A mechanism is provided 1303 pursuant to which the subscriber can request that no further notifications be sent to his or her electronic mail address.

Figure 14:
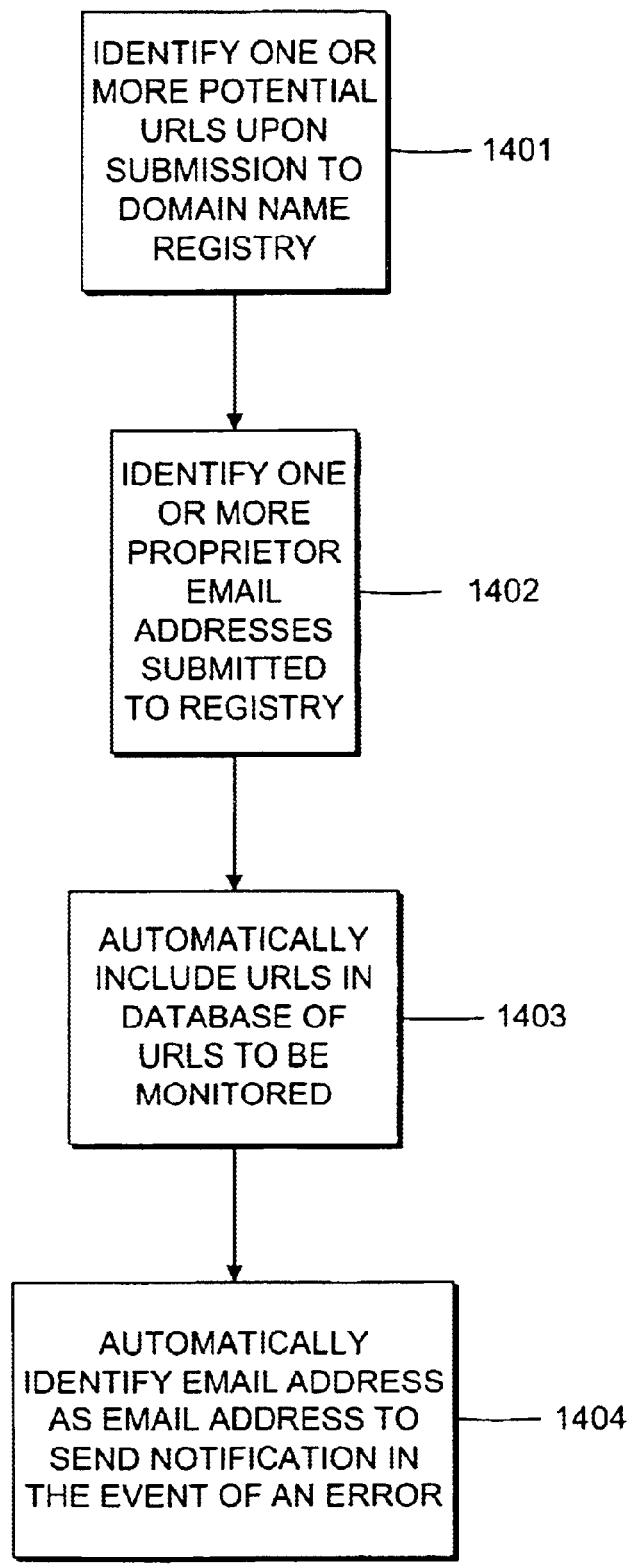
FIG. 14 illustrates a flow diagram of domain name registry co-enrollment.

In another example, a subscriber may automatically be enrolled in a remote Web site monitoring service of the present invention when the subscriber submits the URL of the site to a domain name registry seeking registration of the domain. A flow chart illustrating this process is shown in FIG. 14. With reference to FIG. 14, one or more potential URLs are identified when the domain name is submitted to the domain name registry in step 1401 and are automatically included in the database of URLs to be monitored in step 1403. One or more electronic mail addresses submitted by the subscriber in connection with the registering of the domain name are identified in step 1402 and are automatically identified as the electronic mail address(es) to which a notification is sent upon the detection of a site event by the monitoring service in step 1404. The site event may correspond to registration of the URL with the domain name registry service; may occur when the site becomes accessible by users of the Internet; or may correspond to detection of an error in the site by the monitoring service.

In addition to the monitoring service provider sending electronic notifications, the monitoring service provider and its strategic partner, such as the search engine service or the domain name registry, may maintain a co-branded Web site where users of the monitoring service may visit to view a report on the performance of their Web site.

Figure 15:
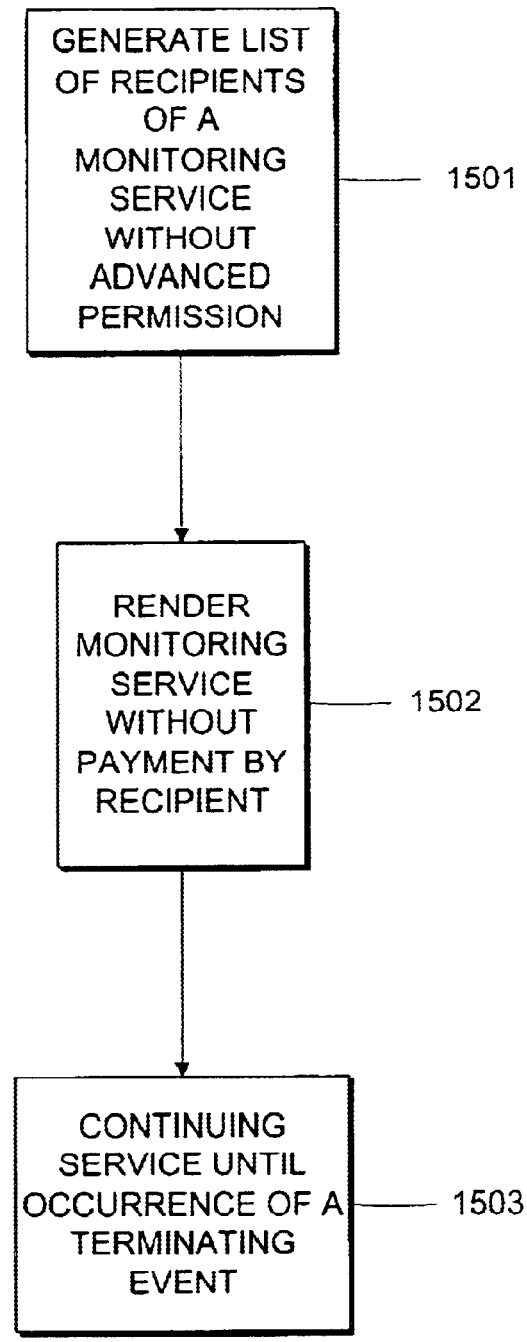
FIG. 15 illustrates a flow diagram of Web mapping and list generation.

In a further embodiment, a list of recipients of the remote Web site monitoring service is generated by way of the Web mapping process described earlier. A flow chart illustrating this process is shown in FIG. 15. The list is usable for a number of commercial purposes in addition to the monitoring service. The list is at least initially generated without advance permission from the recipient in step 1501 and the monitoring service is rendered by a service provider without payment by the recipient (or in some cases even the knowledge of the recipient) in step 1502. The service is then rendered to the recipient continually until the occurrence of a terminating event in step 1503, which may be the receipt by the service provider of a request by the recipient to terminate the monitoring service or a failure of the service provider to receive a response from the recipient after an initial error notification is sent.

Figure 16:
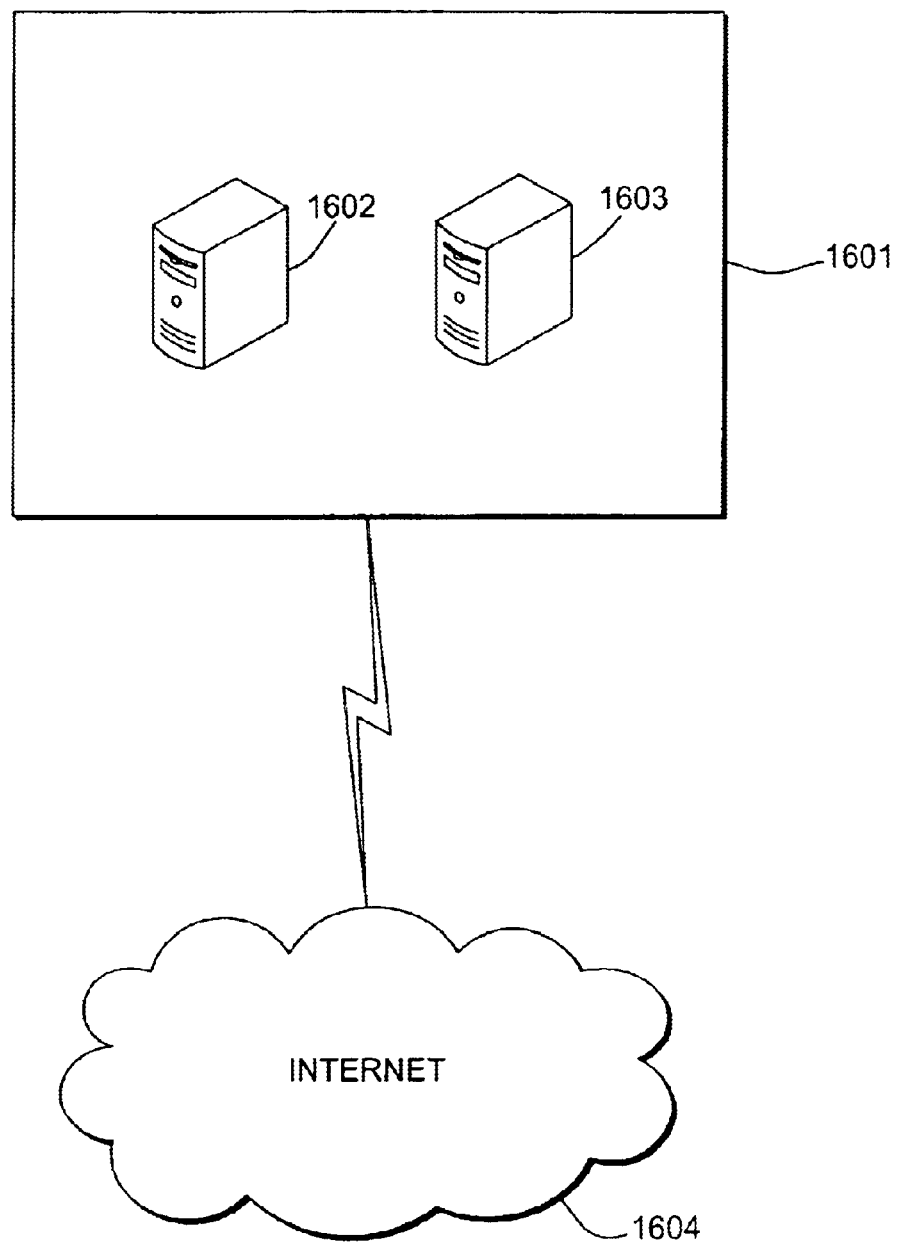
FIG. 16 illustrates the hardware associated with the monitoring system of a preferred embodiment of the present invention.

The hardware requirements for a preferred embodiment of the present invention are shown in FIG. 16. Two servers 1602 and 1603 are housed at premises used by the monitoring service provider at location 1601. Application server 1602 performs the monitoring services. Database server 1603 stores the URL and electronic mail address information. Servers 1602 and 1603 are connected to the Internet 1604 by means which are well known in the art. FIG. 17 illustrates a further embodiment of the present invention in which the monitoring is performed from a plurality of locations in addition to the premises of used by the monitoring service provider 1701 to house the database server 1705 and application server 1706. Additional applications servers 1707 and 1708 are housed in locations 1703 and 1702 and perform monitoring services in addition those performed by applications server 1706 at location 1701. Servers 1707 and 1708 are connected to the Internet 1704 by means which are well known in the art. The monitoring services are preferably performed in a cycle from locations 1701, 1703, and 1702, from servers 1706, 1707, and 1708.

The previous description of the preferred embodiments is provided to enable those skilled in the art to make and use the present invention. The various modifications to these embodiments will be readily apparent to those skilled in the art, and the generic principles defined herein may be applied to other embodiments without the use of the inventive faculty. For example, the systems and methods of the present invention may be used to monitor not only web sites, but also all devices which operate via a global communications network such as appliances, including household appliances, PDAs or cellular telephones.

Thus, the present invention is not intended to be limited to the embodiments shown herein but is to be accorded the widest scope consistent with the principles and novel features disclosed herein.

What is claimed is:

1. A method of identifying at least one appropriate electronic mail address to which a notification is sent upon an occurrence of an error in a site located on a global communications network, wherein said site is being monitored for the occurrence of errors, comprising the steps of:
   (A) extracting at least one electronic mail address from said site;
   (B) assigning each said electronic mail address one or more categories;
   (C) assigning each said electronic mail address a priority; and
   (D) identifying, based upon said priority, the at least one appropriate electronic mail address to which said electronic notification is sent upon said occurrence of said error in said site:
   wherein said notification is at least initially performed without the advance permission of a representative of a proprietor of the site and wherein a fee is not charged for said monitoring, and wherein said assignment of priority step comprises:
   (E) assigning a weight to each said category assigned to said electronic mail address; and
   (F) assigning said priority based on said weights.

2. A method of identifying at least one appropriate electronic mail address to which a notification is sent upon an occurrence of an error in a site located on a global communications network, wherein said site is being monitored for the occurrence of errors, comprising the steps of:
   (A) extracting at least one electronic mail address from said site;
   (B) assigning each said electronic mail address one or more categories;
   (C) assigning each said electronic mail address a priority;
   (D) identifying, based upon said priority, the at least one appropriate electronic mail address to which said electronic notification is sent upon said occurrence of said error in said site; and
   (E) ceasing to send said notification upon receipt of a predetermined response from a user associated with said appropriate electronic mail address,
   wherein said notification is at least initially performed without the advance permission of a representative of a proprietor of the site and wherein a fee is not charged for said monitoring.

3. A method of enrolling a subscriber in a service, which service remotely monitors a site located on a global communications network for errors and which service sends a notification to an electronic mail address upon the occurrence of a site event, comprising the steps of:
   (A) identifying one or more potential electronic location addresses associated with said site upon submission of an electronic location address to a domain name registry service for registration;
   (B) identifying at least one proprietor electronic mail address associated with a representative of a proprietor of said site upon submission of said electronic mail address to said domain name registry service;
   (C) automatically including said potential electronic location addresses in a database of electronic location addresses associated with one or more additional sites which are located on said global communications network and which are monitored by said monitoring service; and
   (D) automatically identifying said at least one proprietor electronic mail address as the electronic mail address to which said notification is sent upon the occurrence of said site event, wherein said site event corresponds to registration of the electronic location address with said domain name registry service.

4. A method of enrolling a subscriber in a service, which service remotely monitors a site located on a global communications network for errors and which service sends a notification to an electronic mail address upon the occurrence of a site event, comprising the steps of:
   (A) identifying one or more potential electronic location addresses associated with said site upon submission of an electronic location address to a domain name registry service for registration;
   (B) identifying at least one proprietor electronic mail address associated with a representative of a proprietor of said site upon submission of said electronic mail address to said domain name registry service;
   (C) automatically including said potential electronic location addresses in a database of electronic location addresses associated with one or more additional sites which are located on said global communications network and which are monitored by said monitoring service; and
   (D) automatically identifying said at least one proprietor electronic mail address as the electronic mail address to which said notification is sent upon the occurrence of said site event, wherein said site event occurs when said site becomes accessible by users of said global communications network.

5. A method of generating a list of at least one recipient of a remote monitoring service, which monitoring service detects one or more events on a site located on a global communications network, wherein said list is usable for a plurality of commercial purposes in addition to said monitoring service, comprising the steps of:
   (A) generating said list at least initially without advance permission from said at least one recipient;
   (B) rendering said monitoring service by a service provider without payment by said at least one recipient; and
   (C) rendering said service to said at least one recipient continually until the occurrence of a terminating event, wherein said terminating event is a failure of said service provider to receive a response from said at least one recipient.

* * * * *